United States Patent
Feldmann et al.

(10) Patent No.: US 10,053,218 B2
(45) Date of Patent: Aug. 21, 2018

(54) SYSTEM AND METHOD FOR POSITIONING AN UNMANNED AERIAL VEHICLE

(71) Applicant: General Electric Company, Schenectady, NY (US)

(72) Inventors: Michael Steven Feldmann, Rockford, MI (US); Michael Joseph Dell'Anno, Clifton Park, NY (US); Mauricio Castillo-Effen, Rexford, NY (US); James Gerard Lopez, East Schodack, NY (US); Frank Saggio, III, Byron Center, MI (US); William J. Berendsen, Grand Rapids, MI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/087,015

(22) Filed: Mar. 31, 2016

(65) Prior Publication Data
US 2017/0285627 A1    Oct. 5, 2017

(51) Int. Cl.
*B64C 39/02* (2006.01)
*H04B 7/185* (2006.01)
(Continued)

(52) U.S. Cl.
CPC ......... *B64C 39/024* (2013.01); *G05D 1/0022* (2013.01); *G05D 1/0094* (2013.01);
(Continued)

(58) Field of Classification Search
CPC .... G05D 1/0011; G05D 1/0094; G05D 1/101; B64C 39/024; B64C 2201/063;
(Continued)

(56) References Cited

U.S. PATENT DOCUMENTS

| 6,868,314 | B1 | 3/2005 | Frink |
| 7,681,839 | B2 | 3/2010 | Mickley et al. |

(Continued)

FOREIGN PATENT DOCUMENTS

| CN | 104638779 A | 5/2015 |
| JP | 2014500827 A | 1/2014 |

(Continued)

OTHER PUBLICATIONS

GE Aviation Systems, "Electro Optical Grid Reference System", 2012, 2 pages.
(Continued)

*Primary Examiner* — Yuen H Wong
(74) *Attorney, Agent, or Firm* — GE Global Patent Operation; Pabitra Chakrabarti

(57) ABSTRACT

A system for positioning an unmanned aerial vehicle is provided including a position reference system including an electromagnetic radiation transmitter configured to modulate a transmission signal to encode location information associated with a coordinate system relative to the electromagnetic radiation transmitter. The system further includes an unmanned aerial vehicle including at least one control device configured to control a position of the unmanned aerial vehicle and an electromagnetic radiation receiver configured to receive the transmission signal. The unmanned aerial vehicle further includes a control system configured to control the at least one control device based at least in part on the location information received by the electromagnetic radiation receiver.

14 Claims, 11 Drawing Sheets

(51) Int. Cl.
*H04W 4/02* (2018.01)
*G05D 1/10* (2006.01)
*G05D 1/00* (2006.01)

(52) U.S. Cl.
CPC ........... *G05D 1/101* (2013.01); *H04B 7/1851* (2013.01); *H04W 4/025* (2013.01); *B64C 2201/063* (2013.01); *B64C 2201/066* (2013.01); *B64C 2201/127* (2013.01); *B64C 2201/141* (2013.01); *B64C 2201/146* (2013.01)

(58) Field of Classification Search
CPC ........ B64C 2201/066; B64C 2201/127; B64C 2201/146; H04B 7/1851; H04W 4/025
See application file for complete search history.

(56) References Cited

U.S. PATENT DOCUMENTS

| | | | |
|---|---|---|---|
| 7,686,252 B2 | 3/2010 | Mickley et al. | |
| 8,104,716 B2 | 1/2012 | Mickley et al. | |
| 8,314,928 B2 | 11/2012 | Tzidon et al. | |
| 8,326,523 B2 | 12/2012 | Stimac et al. | |
| 8,352,100 B2 | 1/2013 | Stimac et al. | |
| 8,386,096 B2 | 2/2013 | Stimac et al. | |
| 8,463,463 B1 | 6/2013 | Feldmann et al. | |
| 8,561,947 B2 | 10/2013 | Feldmann et al. | |
| 8,577,288 B2 | 11/2013 | Rhodes et al. | |
| 8,582,195 B2 | 11/2013 | Lopez et al. | |
| 8,788,119 B2 | 7/2014 | Tillotson et al. | |
| 8,872,081 B2 | 10/2014 | Feldmann et al. | |
| 9,085,370 B2 | 7/2015 | Lopez et al. | |
| 2010/0163679 A1* | 7/2010 | Mickley | G01S 1/70 244/135 A |
| 2013/0301905 A1* | 11/2013 | Malecki | G05D 1/0676 382/154 |
| 2015/0241562 A1* | 8/2015 | Goldberg | G01S 17/42 356/3.11 |
| 2015/0336669 A1* | 11/2015 | Kantor | G01C 21/20 701/3 |
| 2016/0252342 A1 | 9/2016 | Feldmann et al. | |
| 2016/0299233 A1* | 10/2016 | Levien | G01C 21/00 |
| 2017/0010615 A1 | 1/2017 | Tanaka et al. | |

FOREIGN PATENT DOCUMENTS

| | | |
|---|---|---|
| WO | 2006091779 A1 | 8/2006 |
| WO | 2007143457 A2 | 12/2007 |
| WO | 2015163106 A1 | 10/2015 |
| WO | 2016007911 A1 | 1/2016 |

OTHER PUBLICATIONS

Pratama et al., "Tracking and control of a small unmanned aerial vehicle using a ground-based 3D laser scanner", System Integration (SII), 2014 IEEE/SICE International Symposium, Dec. 13-15, 2014 pp. 718-723, Tokyo.

Chlestil et al., "Reliable Optical Wireless Links within UAV Swarms", Transparent Optical Networks, 2006 International Conference, Jun. 18-22, 2006, vol. 4, pp. 39-42, Nottingham.

Office Action issued in connection with corresponding JP Application No. 2017-052024 dated Apr. 3, 2018.

* cited by examiner

SYSTEM AND METHOD FOR POSITIONING AN UNMANNED AERIAL VEHICLE

BACKGROUND

The field of the disclosure relates generally to unmanned aerial vehicles and, more particularly, to a system and method for positioning an unmanned aerial vehicle.

An unmanned aerial vehicle (UAV) is an airborne vehicle having no onboard pilot. Typically, UAVs are controlled remotely by a pilot, by onboard control systems, or by a combination of a remote pilot and onboard control system. Most unmanned aerial vehicles include onboard navigation systems such as inertial navigation systems and satellite navigation systems. Unmanned aerial vehicles may use inertial navigation sensors such as accelerometers and gyroscopes for flight positioning and maneuvering and satellite-based navigation for general positioning and wayfinding. Satellite-based navigation systems compensate for location error caused by accelerometer and gyroscope bias, drift, and other errors. However, manmade structures and natural features may interfere with satellite-based navigation systems thereby interfering with accurate positioning and control of UAVs.

BRIEF DESCRIPTION

In one aspect, a system for positioning an unmanned aerial vehicle is provided. The system includes a position reference system including an electromagnetic radiation transmitter configured to modulate a transmission signal to encode location information associated with a coordinate system relative to the electromagnetic radiation transmitter. The system further includes an unmanned aerial vehicle including at least one control device configured to control a position of the unmanned aerial vehicle and an electromagnetic radiation receiver configured to receive the transmission signal. The unmanned aerial vehicle further includes a control system configured to control the at least one control device based at least in part on the location information received by the electromagnetic radiation receiver.

In a further aspect, a method for inspecting an industrial asset is provided. The method includes scanning an electromagnetic radiation transmitter along a raster pattern and transmitting a transmission signal. The method further includes modulating the transmission signal to encode the transmission signal with location information associated with a position of the scanning electromagnetic radiation transmitter in the raster pattern. The location information is relative to the industrial asset. The method further includes receiving the transmission signal with an electromagnetic radiation receiver of an unmanned aerial vehicle, and controlling a control device of the unmanned aerial vehicle, using a control system of the unmanned aerial vehicle, based on the location information received by the electromagnetic radiation receiver.

In another aspect, a system for positioning an unmanned aerial vehicle for imaging an industrial asset is provided. The system includes a position reference system that includes an electromagnetic radiation transmitter configured to modulate a transmission signal to encode location information associated with a coordinate system relative to the electromagnetic radiation transmitter. The system further includes an unmanned aerial vehicle that includes at least one control device configured to control a position of said unmanned aerial vehicle and an electromagnetic radiation receiver configured to receive the transmission signal. The unmanned aerial vehicle further includes a control system configured to control the at least one control device based at least in part on the location information received by the electromagnetic radiation receiver to position the unmanned aerial vehicle within a line of sight of the industrial asset and image the industrial asset with a sensory payload coupled to the control system.

DRAWINGS

These and other features, aspects, and advantages of the present disclosure will become better understood when the following detailed description is read with reference to the accompanying drawings in which like characters represent like parts throughout the drawings, wherein.

Figure 1:
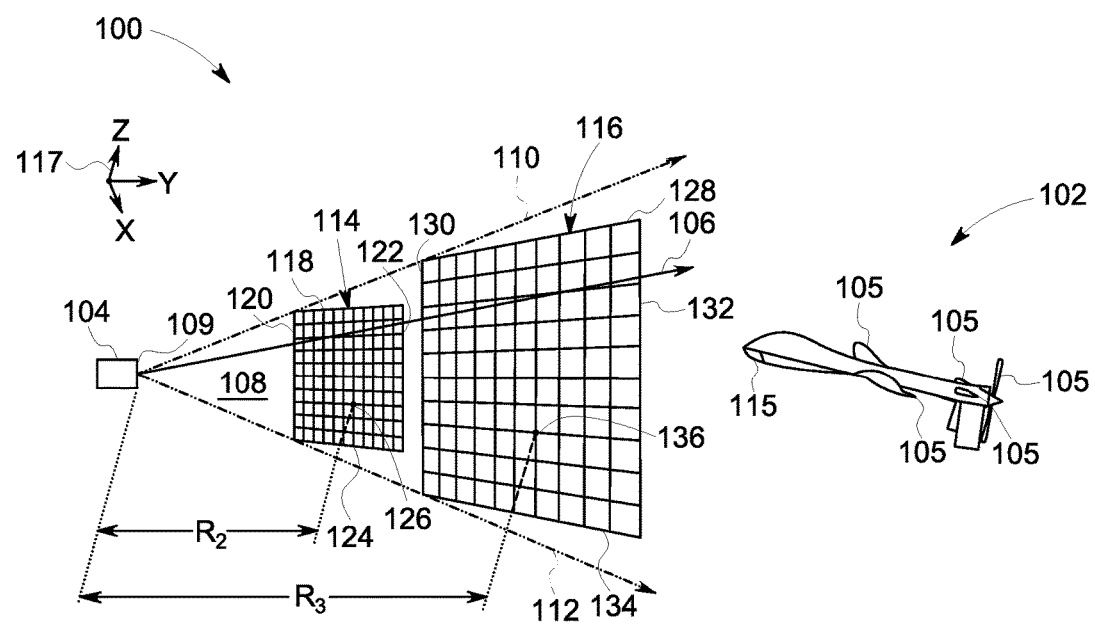
FIG. 1 is a schematic view of an exemplary unmanned aerial vehicle (UAV) system including a UAV and a positioning system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "real-time commands" is intended to be representative of instructions formatted to control a control system and related components that are received and then executed in order. These activities occur substantially instantaneously. Real-time commands are not stored for execution at a substantially later time or execution in an order other than the order in which the commands are received.

The monitoring method and systems described herein provide for enhanced positioning and locating of an unmanned aerial vehicle. Furthermore, the method and systems described herein allow for enhanced imaging of an industrial asset by the unmanned aerial vehicle as the unmanned aerial vehicle is located stationary relative to the industrial asset by the enhanced positioning of the unmanned aerial vehicle. Also, the system and methods described herein facilitate data transfer by a line of sight transceiver of the unmanned aerial vehicle by maintaining the unmanned aerial vehicle at a stationary location. Additionally, the system and methods described herein facilitate wireless charging of the unmanned aerial vehicle by maintaining the unmanned aerial vehicle at a stationary location. By accurately positioning and locating an unmanned aerial vehicle relative to a fixed or moving positioning system, the unmanned aerial vehicle is capable of enhanced imaging of industrial assets, data transmission by a line of sight transceiver, and wireless charging of the unmanned aerial vehicle.

FIG. 1 is a schematic view of an exemplary unmanned vehicle (UV) system 100 including a UAV 102 and a positioning system 104. In the exemplary embodiment, UAV 102 is a vehicle capable of flight without an onboard pilot. For example, and without limitation, UAV 102 is a fixed wing aircraft, a tilt-rotor aircraft, a helicopter, a multirotor drone aircraft such as a quadcopter, a blimp, a dirigible, or other aircraft. In alternative embodiments, UV system 100 includes a ground based UV (not shown). For example, and without limitation, the ground based UV is a wheeled vehicle such as car or truck type vehicle, a tracked vehicle, or other ground vehicle. The ground based UV may be any size. In further alternative embodiments, UV system 100 includes a water-going vehicle. For example, and without limitation, the water-going vehicle is a surface vehicle such as a boat or a submersible vehicle such as a submarine.

UAV 102 includes at least one control device 105. Control device 105 produces a controlled force and maintains or changes a position, orientation, or location of UAV 102. Control device 105 is a thrust device or a control surface. A thrust device is a device that provides propulsion or thrust to UAV 102. For example, and without limitation, a thrust device is a motor driven propeller, jet engine, or other source of propulsion. A control surface is a controllable surface or other device that provides a force due to deflection of an air stream passing over the control surface. For example, and without limitation, a control surface is an elevator, rudder, aileron, spoiler, flap, slat, air brake, or trim device. Control device 105 may also be a mechanism configured to change a pitch angle of a propeller or rotor blade or a mechanism configured to change a tilt angle of a rotor blade.

UAV 102 is controlled by systems described herein including, without limitation, an onboard control system (shown in FIG. 4), a ground control station (not shown in FIG. 1), at least one control device 105, and a positioning system 104. UAV 102 may be controlled by, for example, and without limitation, real-time commands received by UAV 102 from the ground control station, a set of pre-programmed instructions received by UAV 102 from the ground control station, a set of instructions and/or programming stored in the onboard control system, or a combination of these control schemes.

Real-time commands control at least one control device 105. For example, and without limitation, real-time commands include instructions that, when executed by the onboard control system, cause a throttle adjustment, flap adjustment, aileron adjustment, rudder adjustment, or other control surface or thrust device adjustment. In some embodiments, real-time commands further control additional components of UAV 102. For example, and without limitation, real-time commands include instruction that when executed by the onboard control system cause a camera (shown in FIG. 4) to capture an image, a line of sight transceiver (shown in FIG. 4) to transmit data, a communications system (shown in FIG. 4) to transmit data, or a wireless charging receiver (shown in FIG. 4) to change a power source (shown in FIG. 4).

A set of predetermined instructions received from the ground control station is two or more instructions formatted to control UAV 102 when executed by the onboard control system. For example, and without limitation, a set of instructions is a sequence of two or more instructions formatted to control at least one control device 105, two or more instructions formatted to control at least one control device 105 to reduce movement of UAV 102 away from a predetermined point, a sequence of two or more instructions formatted to control at least one control device 105 to move UAV 102 to a predetermined position, a sequence of two or more instructions formatted to control at least one control device 105 to move UAV 102 to a predetermined location, or a sequence of two or more instructions formatted to control at least one control device 105 to execute a maneuver to change the position of UAV 102. A maneuver is for example, and without limitation, a roll, a yaw, a climb, a dive, a slip turn, a banked turn, a standard rate turn, or other maneuver. In some embodiments, a set of instructions received from the ground control station further controls additional components of UAV 102. For example, and without limitation, the set of instructions when executed by the onboard control system cause a camera or sensory payload to capture an image, a line of sight transceiver to transmit data, a communications system to transmit data, or a wireless charging receiver to change a power source.

A set of instructions and/or programming stored in the onboard control system and executed by the onboard control system may control UAV 102. The set of instructions or programming are stored in memory of UAV 102 and are provided to the memory. For example, and without limitation, the set of instructions or programming is transmitted, through a wireless or wired connection to the onboard control system, and stored in memory. The set of instructions or programming may be general or task specific. General instructions or programming is, for example, and without limitation, formatted to control at least one control device 105 to perform a specific maneuver, control at least one control device 105 to perform a specific set of maneuvers, control at least one control device 105 to operate UAV 102 in a specific mode such as a station-keeping mode to reduce movement of UAV 102 relative to a specific position, or control a camera or sensory payload to capture an image, a line of sight transceiver to transmit data, a communications system to transmit data, or a wireless charging receiver to change a power source.

In some embodiments, UAV 102 is controlled by a combination of real-time commands, a set of instructions received from the ground control station, and a set of instructions and/or programming stored in the onboard control system. For example, and without limitation, real-time commands are used to initiate a specific task such as identifying an industrial asset or a portion of an industrial asset to be inspected. A set of instructions received by UAV 102 from the ground control station causes UAV 102 to travel to a series of waypoints and ultimately to the industrial asset or portion of the industrial asset to be inspected. A set of instructions and/or programming stored in the onboard control system are executed to perform maneuvers using control devices 105 to cause UAV 102 to travel to each waypoint.

UV system 100 includes a positioning system 104 to improve the positioning of UAV 102. For example, and without limitation, satellite-based navigation systems and other systems may be less precise than positioning system 104 and/or be negatively impacted by interference due structures or natural features. Positioning system 104 transmits transmission signal 106. Transmission signal 106 is encoded with location information. The location information is associated with and relative to positioning system 104. Positioning system 104 transmits transmission signal 106, within a field of transmission 108, using an electromagnetic radiation transmitter 109. Electromagnetic radiation transmitter 109 is configured to transmit transmission signal 106 in a pattern. The pattern produces, within an upper bound 110 and a lower bound 112, a first grid 114 and a second grid 116. For example, electromagnetic radiation transmitter 109 scans a beam emitted by electromagnetic radiation transmitter 109 in a raster pattern, and transmission signal 106 is encoded onto the beam using modulation when the beam is scanning across a specific point within the raster pattern. This creates the points at the intersecting lines of first grid 114 and second grid 116. Location data information included in transmission signal 106 corresponds to a location of the beam transmitted by electromagnetic radiation transmitter 109 within the raster pattern.

First grid 114 and second grid 116 result from transmission of transmission signal 106 in the pattern which projects intersecting lines substantially in the Y-direction of a coordinate system 117. The projection of intersecting lines, viewed in the Z-X plane at some distance R2 away from the positioning system 104, appears as first grid 114. The same projection of intersecting lines, viewed at a distance R3 which is greater than the first distance R2 in the Z-X plane, appears as second grid 116, which appears relatively larger than first grid 114.

First grid 114 at distance R2 away from the positioning system 104 is spatially bound in the horizontal direction by a first vertical line 120 and a last vertical line 122. A plurality of vertical lines spatially and temporally generated between first vertical line 120 and last vertical line 122 results from the timing of transmission of transmission signal 106 by positioning system 104 as electromagnetic radiation transmitter 109 moves within the raster pattern. First grid 114 at a distance R2 away from positioning system 104 is spatially bound in the vertical direction by a first horizontal line 118 and a last horizontal line 124. A plurality of horizontal lines spatially and temporally generated between first horizontal line 118 and last horizontal line 124 results from the timing of transmission of transmission signal 106 by positioning system 104 as electromagnetic radiation transmitter 109 moves within the raster pattern.

The distance R2 can be any distance between first grid 114 and positioning system 104. For convenience, the distance is determined between a point 126 on first grid 114 and positioning system 104 as shown.

The vertical and horizontal lines may be formed in any suitable manner by positioning system 104. In the exemplary embodiment, the vertical and horizontal lines are formed as a result of a raster pattern traveled electronically or mechanically by electromagnetic radiation transmitter 109 and the timing of the transmission of transmission signal 106 as electromagnetic radiation transmitter 109 travels along the raster pattern. In other embodiments, the vertical and horizontal lines result from other transmission schemes. For example, all of the lines may be formed sequentially or all at once. One of the vertical lines or the horizontal lines may be formed before the other. Positioning system 104 may alternate between forming vertical and horizontal lines through transmission of transmission signal 106. Positioning system 104 may use a scanning laser to form the vertical and the horizontal lines, the laser sequentially forms all of one of the vertical and horizontal lines, followed by the sequential forming of the other of the vertical and horizontal lines. The rate at which the lines are sequentially formed may be so fast that for practical purposes, it is as if all of the lines were simultaneously formed.

Second grid 116 at distance R3 away from positioning system 104 is the same as the first grid 114 in terms of the number of horizontal and vertical lines and the number of transmission signals 106, but at further distance from positioning system 104 than first grid 114. Second grid 116 is spatially bound in the horizontal direction by a first vertical line 130 of second grid 116 and a last vertical line 132 of second grid 116. A plurality of vertical lines spatially and temporally generated in between first vertical line 130 of second grid 116 and last vertical line 132 of second grid 116 results from the timing of transmission of transmission signal 106 by positioning system 104 as electromagnetic radiation transmitter 109 moves within the raster pattern. Second grid 116 at a distance R3 away from positioning system 104 is spatially bound in the vertical direction by a first horizontal line 128 of second grid 116 and a last horizontal line 134 of second grid 116. A plurality of horizontal lines spatially and temporally between first horizontal line 128 of second grid 116 and last horizontal line 134 of second grid 116 results from the timing of transmission of transmission signal 106 by positioning system 104 as electromagnetic radiation transmitter 109 moves within the raster pattern. The distance R3 can be any distance between second grid 116 and positioning system 104, distance R3 greater than distance R2. For convenience, the distance R3 is determined between a point 136 on second grid 116 and positioning system 104 as shown.

The similarity of first grid 114 and second grid 116 becomes apparent in the case of projected grid lines, where second grid 116 is formed by the same lines forming first grid 114, except second grid 116 is observed at a further distance from positioning system 104, making second grid 116 appear larger than first grid 114. Second grid 116 is the appearance of the grid lines generated by positioning system 104 at distance R3 and first grid 114 is the appearance of the grid lines at distance R2. The spacing between each horizontal line and the spacing between each vertical line increases as the distance from positioning system 104 increases. Point 126 and point 136 are at corresponding locations within first grid 114 and second grid 116, respectively. The spatial portion of the location information encoded on transmission signal 106 passing through points 126 and 136 is the same. The transmission signal is also encoded with temporal location information such as a time stamp at transmission of the transmission signal 106. The time stamp allows for a determination of the distance from positioning system 104 when transmission signal 106 is received by electromagnetic radiation receiver 115 of UAV 102. The difference in the time transmission signal 106 is transmitted and received is used to calculate the distance between UAV 102 and positioning system 104. This allows for a determination of a position UAV 102 in the Y-direction. The time difference also allows for a determination of the spacing between each horizontal line and the spacing between each vertical line at the distance from positioning system 104 where UAV 102 receives transmission signal 106. The spatial location information encoded on transmission signal 106, along with the known distance between each horizontal line and the spacing between each vertical line, allows for a determination of a position of UAV 102 within the Z-X plane. These determinations are made by a control system (shown in FIG. 4) of UAV 102.

First grid 114 and second grid 116 may include any number of vertical lines and any number of horizontal lines. The number of vertical lines and the number of horizontal lines is a function of the speed at which electromagnetic radiation transmitter 109 traverses the raster pattern and the frequency with which transmission signal 106 is transmitted. As illustrated, they are comprised of ten vertical lines by ten horizontal lines. A greater number of intersecting lines may result in improved detection and angular resolution for a fixed field of transmission 108 and distance from positioning system 104 in comparison to a fewer number of intersecting lines. First grid 114 and second grid 116 are depicted as having a square shape, but in alternative embodiments first grid 114 and second grid 116 have other shapes. For example, and without limitation, first grid 114 and second grid 116 are rectangular, oval, trapezoidal, or circular. The intersecting lines of first grid 114 and second grid 116 are orthogonal, but in alternative embodiments the intersecting lines of first grid 114 and second grid 116 intersect at other angles. For example, and without limitation the angles between the intersecting lines may be right angles, acute angles, or obtuse angles in different parts of the grid.

UV system 100 and positioning system 104 uses a Cartesian coordinate system. In alternative embodiments, other coordinate systems are used by UV system 100 and positioning system 104. For example, and without limitation, UV system 100 and positioning system 104 use a polar coordinate system, cylindrical coordinate system, or spherical coordinate system. Positioning system 104 transmits transmission signal 106 using an altered raster pattern or other transmission pattern when UV system 100 and positioning system 104 use a coordinate system other than a Cartesian coordinate system. For example, and without limitation, to form first grid 114 and second grid 116 in a polar coordinate system, positioning system 104 projects transmission signal 106 in field of transmission 108 using a transmission pattern which generates a series of concentric circles and lines radiating out from the center of the circles. Transmission signal 106 is projected along a series of points along the concentric circles and lines radiating out from the center of the circles.

First grid 114 and second grid 116 of intersecting projected lines are generated by raster scanning each of the lines or by projecting and scanning an elongated radiation beam. Positioning system 104, using electromagnetic radiation transmitter 109, raster scans horizontally to generate a first horizontal line. The grid generator then steps to the next horizontal line location and raster scans a subsequent horizontal line. This process is repeated for subsequent horizontal lines until all the horizontal lines are generated. The vertical lines are scanned in a similar manner with a first vertical line generated followed by stepping and repeating the process for a next vertical line and all other subsequent vertical lines until all the vertical lines are generated. In an alternative embodiment, positioning system 104 raster scans in only one direction (e.g., horizontally or vertically) and controls the timing of transmission signal 106 such that transmission signal 106 passes through the points at which the horizontal and vertical lines intersect in first grid 114 and second grid 116. In further alternative embodiments, positioning system 104 uses other techniques to transmit transmission signal 106 encoded with location information to form a coordinate system.

In the exemplary embodiment, field of transmission 108 is limited. Field of transmission 108 is bounded by upper bound 110 and lower bound 112. Upper bound 110 and lower bound 112 are fixed based on physical limitations of electromagnetic transmitter 109. Positioning system 104 and/or electromagnetic radiation transmitter 109 are positioned such that an object of interest (not shown), flight path, or other navigational interest falls within or near field of transmission 108. An object of interest includes, for example, and without limitation, a target portion of an industrial asset (shown in FIGS. 10 and 11). The target portion of the industrial asset is a portion, component, or feature of the industrial asset to be inspected, imaged, or otherwise analyzed. For example, and without limitation, an industrial asset is a cell phone tower, a utility pole, an auto or railroad tunnel or bridge, a power line or transformer, a nuclear facility, an oil or gas pipeline, an offshore oil platform asset such as a flare stack, or a wind turbine installation, either on shore or offshore. An object of interest further includes, for example, and without limitation, a ground control station, wireless power transmitter (shown in FIG. 7), or a line of sight transceiver (shown in FIG. 4).

In alternative embodiments, field of transmission 108 is not limited or is substantially not limited. Positioning system 104 and/or electromagnetic transmitter 109 transmit transmission signal 106 in all directions radiating from positioning system 104. For example, and without limitation, electromagnetic transmitter 109 is mounted in a spherical mounting system, includes a plurality of electromagnetic transmitters 109, or is otherwise configured to transmit transmission signal 106 in all directions. In some embodiments, field of transmission is substantially not limited but has at least some bounds resulting from a mounting system coupling electromagnetic transmitter 109 to positioning system 104.

In the exemplary embodiment, electromagnetic radiation transmitter 109 transmits a coherent beam of electromagnetic radiation. Electromagnetic transmitter is, for example, and without limitation, a laser, maser, or other source of electromagnetic radiation. In alternative embodiments, electromagnetic transmitter 109 transmits electromagnetic radiation having a different beam pattern. For example, and without limitation, electromagnetic radiation transmitter 109 transmits an incoherent beam of electromagnetic radiation. In the exemplary embodiment, electromagnetic radiation transmitter 109 transmits electromagnetic radiation at a wavelength falling outside of the visible light spectrum. For example, and without limitation, electromagnetic radiation transmitter 109 transmits electromagnetic radiation falling within the infrared or ultraviolet spectrums. In alternative embodiments, electromagnetic radiation transmitter 109 transmits electromagnetic radiation within the visible light spectrum.

Electromagnetic radiation receiver 115 is configured to receive transmission signal 106. Electromagnetic radiation receiver 115 is any sensor or combination of sensors configured to measure electromagnetic radiation. For example, and without limitation, electromagnetic radiation receiver 115 is one or more active-pixel sensors, bolometers, charge-coupled devices (CCD) sensors, photodiodes, complementary metal-oxide-semiconductor (CMOS) sensors, or other photodetectors. In some embodiments, electromagnetic radiation receiver 115 is an array of a plurality of sensors (shown in FIG. 3). Electromagnetic radiation receiver 115 is coupled to the control system of UAV 102.

UAV 102 uses the control system to process transmission signals 106 to determine the location of UAV 102 based on the location information included in transmission signals 106. For example, and without limitation, the control system determines a distance between UAV 102 and positioning system 104 based on the transmission time included in transmission signals 106 and a time when transmissions signals 106 are received. The control system determines the location of UAV 102 in the Z-X plane based on the location information encoded on transmission signal 106. For example, and without limitation, the location information includes the point in the raster pattern at which transmission signal 106 is transmitted, an angle of transmission relative to positioning system 104, and/or other information. The control system determines the location of UAV 102 in the Z-X plane based on the point in the raster pattern at which transmission signal 106 is transmitted. Based on the location in the Z-X plane and the distance in the Y-direction from positioning system 104, the control system determines the location of UAV 102 relative to positioning system 104. In some embodiments, transmission signal 106 includes information about the location of positioning system 104. For example, and without limitation, transmission signal 106 includes global positioning system information corresponding to the location of positioning system 104, map coordinates, altitude, and/or other information. Based on the absolute location of positioning system 104 and the relative location of UAV 102 to positioning system 104, the control system determines the absolute location of UAV 102. In alternative embodiments, the control system does not determine the absolute location of UAV 102 and only determines the location of UAV 102 relative to positioning system 104.

In some alternative embodiments, the control system does not determine the location of UAV 102. Rather, the control system identifies the time at which transmission signals 106 are received and transmits this information to a remote system such as the ground control station using a communications system (shown in FIG. 4). The remote system, e.g., the ground control system, determines the location of UAV 102 and transmits the location of UAV 102 to the communications system of UAV 102. UAV 102 uses the location of UAV 102 received from the remote system in controlling, for example, and without limitation, at least one control device 105 to maintain or change a position or location of UAV 102.

Figure 2:
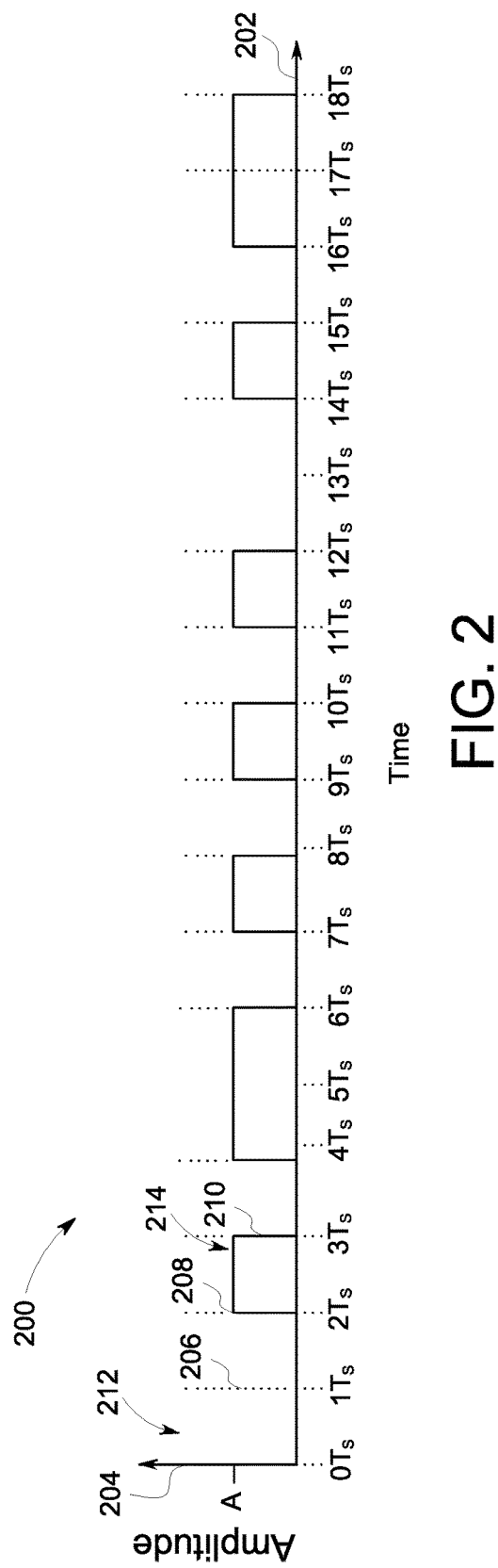
FIG. 2 is an exemplary graphical view of a transmission signal encoded with location information and transmitted by the positioning system shown in FIG. 1.

FIG. 2 is a graphical view 200 of transmission signal 106 (shown in FIG. 1) encoded with location information and transmitted by positioning system 104 (shown in FIG. 1). In the exemplary embodiment, transmission signal 106 is encoded with location information using an amplitude modulation scheme. Graph 200 includes an X-axis 202 defining a time in seconds. Graph 200 includes a Y-axis 204 defining a normalized amplitude. Each time period of $T_s$ corresponds to a bit of information. For example, the time between the origin and point 206 corresponds to one bit. Transmission signal 106 with an amplitude of zero corresponds to a logical "0" bit. For example, bit 212 between point 206 and point 208 is a logical "0" bit. Transmission signal 106 with an amplitude of "A" corresponds to a logical "1" bit. For example, bit 214 between point 208 and point 210 is a logical "1" bit. Some bits are data bits for encoding location information corresponding to first grid 114 and second grid 116 the grid (both shown in FIG. 1). Some bits are start or stop indicators, error checking bits, time stamp bits, or header bits. Electromagnetic radiation receiver 115 (shown in FIG. 1) detects the amplitude of the transmission signal 106 over time and passes this information to a control system (shown in FIG. 4). The control system uses the encoded information as described herein to control UAV 102 (shown in FIG. 1). Upon detection of these bits by electromagnetic radiation receiver 115 and processing by the control system, the location within the grid can be determined. In some embodiments, transmission signals 106 are also used to communicate between positioning system 104 and UAV 102 using messages including information other than just information on locations within first grid 114 and second grid 116.

In alternative embodiments, transmission signal 106 is encoded using other modulation schemes. For example, and without limitation, transmission signal 106 is encoded using frequency modulation, sideband modulation, phase modulation, phase-shift keying, frequency-shift keying, amplitude-shift keying, or quadrature amplitude modulation. In still further embodiments, two or more modulation schemes are used to encode transmission signal 106 with location information.

Figure 3:
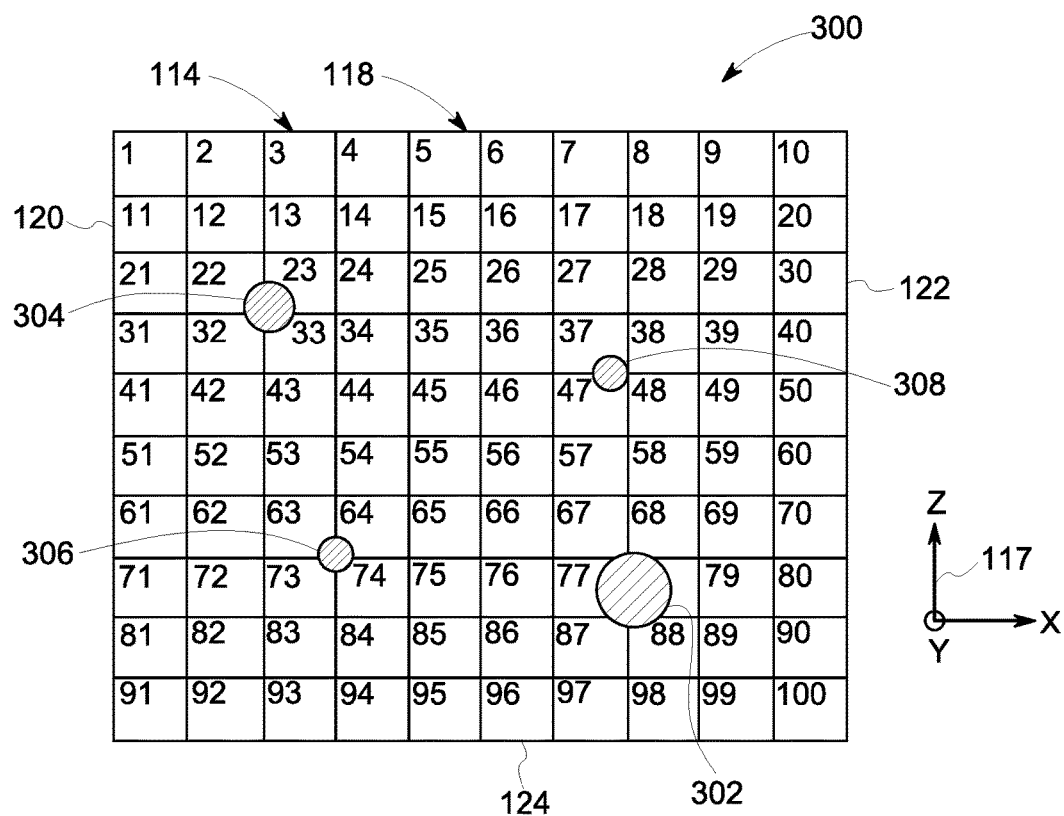
FIG. 3 is an exemplary schematic view of transmission signals transmitted and projected into space by the positioning system shown in FIG. 1.

FIG. 3 is a schematic view 300 of transmission signals 106 (shown in FIG. 1) transmitted and projected into space by positioning system 104 (shown in FIG. 1). View 300 shows first grid 114 projected in the Z-X plane of coordinate system 117. First grid 114 is bound by first vertical line 120 and last vertical line 122. First grid 114 is also bound by first horizontal line 118 and last horizontal line 124. Electromagnetic radiation receiver 115 (shown in FIG. 1) receives transmission signals 106 forming first grid 114. Electromagnetic radiation receiver 115 includes a plurality of receiver components including first receiver component 302, second receiver component 304, third receiver component 306, and fourth receiver component 308. In alternative embodiments, electromagnetic radiation receiver 115 includes a different number of receiver components. Each of the vertical and horizontal lines formed by transmission signals 106 are encoded such that each of the regions within the grid, 1 through 100, can be identified. The four receiver components 302, 304, 306, 308 are in a non-coplanar configuration resulting from the orientation of UAV 102 (shown in FIG. 1). Each circle in FIG. 3 is illustrated with a different size because the non-coplanar spacing of the detectors will yield a different area in intersection with first grid 114.

Each receiver component 302, 304, 306, 308 produces an output signal when it receives transmission signal 106 in first grid 114. When a receiver component 302, 304, 306, 308 crosses an intersection of a vertical line and a horizontal line, the receiver component 302, 304, 306, 308 receives transmission signal 106 encoded with location information specific to that intersection. The output signals of each receiver component 302, 304, 306, 308, resulting from reception of transmission signals 106, are demodulated and processed, using the control system of UAV 102, to determine the location of each receiver component 302, 304, 306, 308 within first grid 114 and the distance of each receiver component 302, 304, 306, 308 from positioning system 104.

Figure 4:
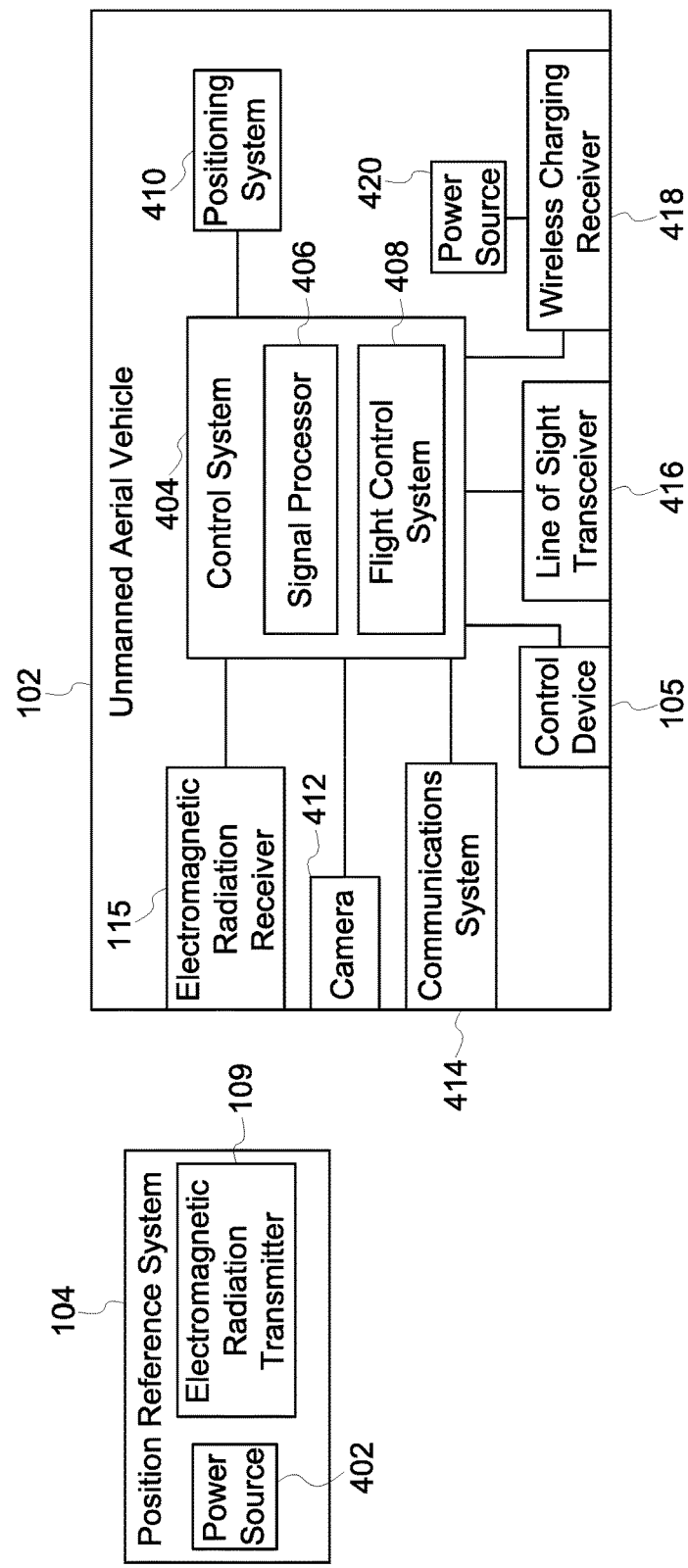
FIG. 4 is a block diagram illustrating the UAV and position reference system of the UAV positioning system shown in FIG. 1.

FIG. 4 is a block diagram illustrating UAV 102 and positioning system 104. Positioning system 104 includes power source 402 and electromagnetic radiation transmitter 109. Power source provides power to electromagnetic radiation transmitter 109 which electromagnetic radiation transmitter 109 uses to transmit transmission signal 106 (shown in FIG. 1). Power source 402 is, for example, and without limitation, one or more of a battery, solar cell, connection to a power grid, generator, or other source of electrical energy. In some embodiments, positioning system 104 includes further components. For example, and without limitation, positioning system 104 includes a control system, a communications system, or other components. In some embodiments, positioning system 104 is always on and transmits transmission signal 106 continuously. In alternative embodiments, positioning system 104 transmits transmission signal 106 on a scheduled basis. For example, and without limitation, positioning system 104 transmits transmission signal 106 during daylight hours, during a fixed work schedule, or other scheduled time periods. In still further embodiments, positioning system 104 receives a communication from a ground control station, UAV 102, or other system which controls transmission of transmission signal 106 by positioning system 104. For example, and without limitation, positioning system 104 is in a listen or standby mode and when positioning system 104 receives a communication from UAV 102 or a ground control station, positioning system 104 begins transmitting transmission signal 106. Positioning system 104 facilitates at least one of: positioning UAV 102 for imaging of an industrial asset or portion thereof (shown in FIG. 10), positioning UAV 102 for line of sight communication of imaging data to a ground control station (show in FIG. 5), positioning UAV 102 for wireless recharging, and positioning UAV 102 for refueling with liquid or solid fuel.

UAV 102 includes electromagnetic radiation receiver 115. Electromagnetic radiation receiver 115 receives transmission signals 106 from electromagnetic radiation transmitter 109 of positioning system 104. Electromagnetic radiation receiver 115 is coupled to control system 404. Electromagnetic radiation receiver 115 outputs a signal to control system 404 which reflects received transmission signal 106. For example, and without limitation, electromagnetic radiation receiver 115 outputs a voltage corresponding to the logical bits encoded on transmissions signal 106. Control system 404 processes the signal from electromagnetic radiation receiver 115 as described herein to determine the location of UAV 102.

Control system 404 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, control system 404 may be a microprocessor that includes read-only memory (ROM) and/or random access memory (RAM), such as, for example, a 32 bit microcomputer with 2 Mbit ROM and 64 Kbit RAM. In the exemplary embodiment, control system 404 also includes a memory device (not shown) that stores executable instructions for performing the functions described herein. For example, in the exemplary embodiment, the memory device stores instructions executed by a signal processor 406 subsystem and flight control system 408 subsystem of control system 404. Signal processor 406 subsystem and flight control system 408 subsystem may be software subsystems, hardware subsystems, or a combination of hardware and software. Control system 404, signal processor 406, and/or flight control system 408 may include one or more processing units (not shown), such as, without limitation, an integrated circuit (IC), an application specific integrated circuit (ASIC), a microcomputer, a programmable logic controller (PLC), and/or any other programmable circuit. The processor(s) may include multiple processing units (e.g., in a multi-core configuration). The processor(s) execute instructions to which perform the functions described herein. The above examples are exemplary only, and thus are not intended to limit in any way the definition and/or meaning of the term "processor."

Signal processor 406 is configured to process the signal(s) received from electromagnetic radiation receiver(s) 115 at control system 404. Signal processor 406 is configured to process transmission signal 106. Signal processor 406 demodulates transmission signal 106 and retrieves location information from transmission signal 106. Based on the location information, signal processor 406 determines the location of UAV 102 relative to positioning system 104 as described herein. For example, and without limitation, signal processor 406 determines the location of UAV 102 in Z-X plane relative to positioning system 104 (shown in FIG. 1) based on a spatial portion of the location information encoded on transmission signal 106. The spatial portion of the location information identifies wherein in first grid 114 and second grid 116 transmission signal 106 is located. This information identifies where in the Z-X plane UAV 102 is located. Signal processor 406 determines the location of UAV 102 in the Y-direction relative to positioning system 104 (shown in FIG. 1) based on temporal location encoded on transmission signal 106. Transmission signal 106 includes a time stamp corresponding to when transmission signal 106 is transmitted. Using the time stamp and the time at which transmission signal 106 is received, signal processor 406 determines the distance between positioning system 106 and UAV 102. In embodiments where first grid 114 and second grid 116 are diverging, e.g., the distance between vertical and/or horizontal lines are spaced further apart in second grid 116 than in first grid 114, signal processor 406 uses the spatial portion and temporal location of transmission signal 106 in combination to determine the location of UAV in the Z-X plane (shown in FIG. 1).

In embodiments where electromagnetic radiation receiver 115 includes multiple components 302, 304, 306, 308 (shown in FIG. 3), signal processor 406 uses location information received by each component 302, 304, 306, 308 to determine the location of UAV 102. For example, and without limitation, signal processor 406 uses a known geometric relationship between each component 302, 304, 306, 308 and the location information provided by each component 302, 304, 306, 308 to determine the location of UAV 102 in the Z-X plane (shown in FIG. 1) and in the Y-direction relative to positioning system 104 (shown in FIG. 1).

In some embodiments, signal processor 406 receives position information from positioning system 410. Position information is information regarding the position of UAV 102 at a specific location. For example, and without limitation, position information includes a roll angle, a yaw angle, a pitch angle, an airspeed, an altitude, and/or other position information. Control system 404 uses position information to control at least one control device 105 to control the flight of UAV 102. Positioning system 410 includes at least one of a gyroscope, accelerometer, inclinometer, and/or other sensors. In some embodiments, positioning system 410 includes a satellite-based navigation system receiver, e.g., a global positioning system receiver, a radio frequency navigation system, and/or other navigation system. In some embodiments, signal processor 406 combines location information with position information using, for example, and without limitation, a Kalman filter. Control system 404 uses the combined information to determine a location of UAV 102.

Flight control system 408 is configured to process at least information from signal processor 406 and to control at least one control device 105 based on the received information. Flight control system 408 controls at least one control device 105 to maintain and/or stabilize UAV 102 at a current location as determined by signal processor 406. Flight control system 408, for example, and without limitation, uses a control feedback loop to maintain UAV 102 at a location based on the location of UAV 102 determined by signal processor 406.

Flight control system 408 is further configured to change a location of UAV 102. Flight control system 408 controls at least one control device 105 to change a location of UAV 102. For example, and without limitation, flight control system 408 controls at least one control device 105 to execute a maneuver such as forward flight, transitioning to or from a hover, a roll, a yaw, a climb, a dive, a slip turn, a banked turn, a standard rate turn, or other maneuver. Flight control system 408 may change the location of UAV 102 from one location to another based on instructions stored locally on UAV 102. For example, and without limitation, flight control system 408 controls at least one control device 105 to change the location of UAV 102 from a first location to another location using location information from positioning system 410, e.g., and without limitation, location information from a global positioning system. This allows flight control system 408 to move UAV 102 between locations such as waypoints, destinations, and/or other defined locations. In some embodiments, flight control system 408 travels from one location to another using positioning system 410 and when UAV 102 receives transmission signal 106 from positioning system 104, flight control system 408 controls UAV 102 to maintain the location of UAV 102 based on transmission signal 106.

Flight control system 408 may also control at least one control device 105 based on information or instructions received at control system 404 from communications system 414. For example, communications system 414 receives instructions from ground control station 500 which when executed by flight control system 408 cause flight control system 408 to control at least one control device 105 to change the location of UAV 102 and/or execute a maneuver. Communications system 414 may also receive instructions from ground control station 500 corresponding to manual control of one or more control devices 105. This allows an operator to manually control UAV 102 in real time using ground control station 500. In some embodiments, flight control system 408 assumes a default state in the absence of instructions received by communications system 414. For example, and without limitation, the default state is to continue flight towards a waypoint or destination, maintain a location using transmission signals 106 received from positioning system 104, maintain a location using information received from positioning system 410, and/or otherwise resume a default state.

Communications system 414 is a wireless communication transceiver configured to communicate using a wireless communication standard such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals).

UAV 102 further includes line of sight transceiver 416. Line of sight transceiver 416 is configured to communicate with an additional line of sight transceiver 416 (shown in FIG. 5) using a line of sight communication technique. For example, and without limitation, line of sight transceiver 416 is configured to transmit and receive a coherent beam of laser light, microwaves, infrared light, and/or other electromagnetic energy. Line of sight transceiver 416 is or includes, for example, and without limitation, a laser, maser, infrared emitter, active-pixel sensor, bolometers, charge-coupled devices (CCD) sensors, photodiodes, or complementary metal-oxide-semiconductor (CMOS) sensors.

UAV 102 further includes wireless charging receiver 418. Wireless charging receiver 418 is configured to receive electromagnetic energy wirelessly and use the received electromagnetic energy to charge a power source 420. For example, and without limitation, wireless charging receiver 418 is configured to receive electromagnetic energy wirelessly by at least one of inductive coupling, resonant inductive coupling, capacitive coupling, magnetodynamic coupling, microwaves, or light transmission to transmit electromagnetic energy. Wireless charging receiver 418 includes one or more antenna devices configured to receiver electromagnetic energy. For example, and without limitation, wireless charging receiver 418 includes wire coils, tuned wire coils, lumped element resonators, electrodes, rotating magnets, parabolic dishes, phased array antennas, lasers, photocells, lenses, and/or other devices for receiving electromagnetic radiation. Power source 420 includes at least one device for storing electrical energy such as a battery, capacitor, fuel cell, and/or other device for storing electrical energy. In alternative embodiments, UAV 102 is powered by liquid and/or solid fuel. UAV 102 includes power source 420 that is a fuel tank or storage device and includes a refueling port (e.g., a probe configured to receive fuel from a drogue or other fuel source). Positioning system 104 is used to position UAV 102 relative to a refueling device and/or fuel source (e.g., in a station keeping mode) for refueling by the refueling device and/or fuel source.

UAV 102 further includes camera 412. Camera 412 is coupled to control system 404 and provides image data to control system 404. Control system 404 controls camera 412. In some embodiments, camera 412 and/or other sensors are coupled to UAV 102 by an actively damped gimbal controlled by control system 404. Other sensors included within the actively damped gimbal may include range finding sensors, LIDAR systems, infrared imaging systems, radar systems, and/or other sensors. Control system 404 controls the position of the actively damped gimbal to direct the sensors therein. For example, and without limitation, control system 404 receives a command, from ground control station 500 using communications system 414, to pan, tilt, rotate, or otherwise reposition a sensor. Control system 404 processes the command and controls the actively damped gimbal to position the sensor according to the received command.

Figure 5:
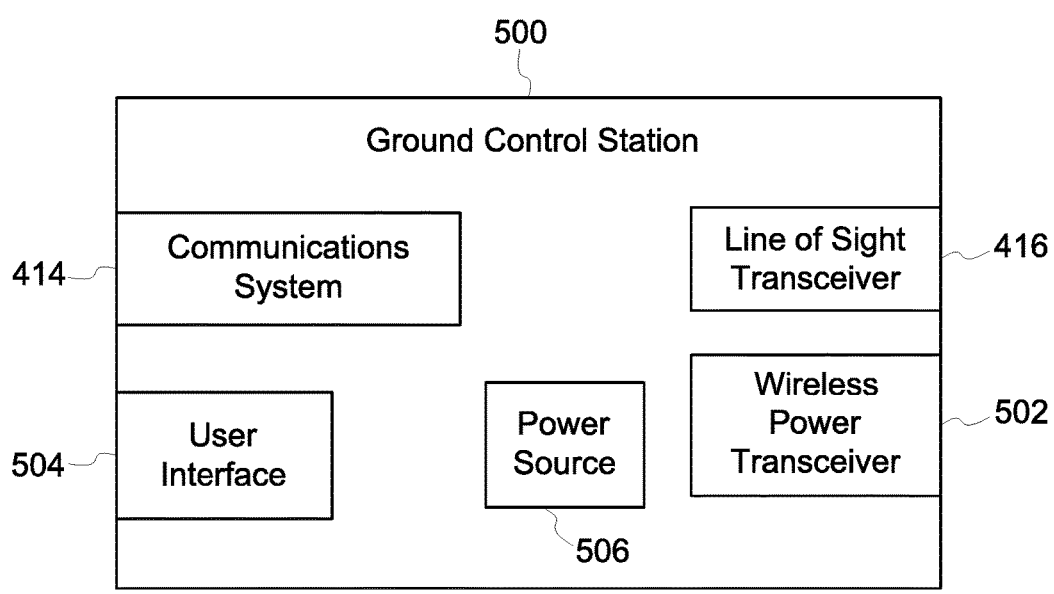
FIG. 5 is a block diagram illustrating a ground control station for use with the UAV positioning system shown in FIG. 1.

FIG. 5 is a block diagram illustrating ground control station 500 for use with UAV 102 and positioning system 104 (both shown in FIGS. 1 and 4). Ground control station 500 includes communications system 414. Communication system 414 is configured to communicate with communications system 414 of UAV 102. As described herein, ground control station 500 sends instructions for controlling UAV 102 to UAV 102 using communications system 414. Commands from an operator are received by ground control station 500 through a user interface 504. These commands are then sent to UAV 102 as instructions using communications system 414. In some embodiments, communications system 414 is further configured for wireless and/or wired communication with other devices such as a personal computer, workstation, network, mobile computing device, and/or other device.

User interface 504 is configured to receive operator inputs and provide outputs to an operator. For example, and without limitation, user interface includes input devices including a keyboard, mouse, touchscreen, joystick(s), throttle(s), buttons, switches, and/or other input devices. For example, and without limitation, user interface includes output devices including a display (e.g., a liquid crystal display (LCD), or an organic light emitting diode (OLED) display), speakers, indicator lights, flight instruments, and/or other output devices.

Ground control station 500 further includes a recharging or refueling device 502 (e.g., and without limitation a wireless power transceiver). For example, and without limitation, wireless power transceiver 502 uses one or more of inductive coupling, resonant inductive coupling, capacitive coupling, magnetodynamic coupling, microwaves, or light transmission to transmit electromagnetic energy. Wireless power transceiver 502 includes one or more antenna devices configured to transmit electromagnetic energy. For example, and without limitation, wireless power transceiver 502 includes wire coils, tuned wire coils, lumped element resonators, electrodes, rotating magnets, parabolic dishes, phased array antennas, lasers, photocells, lenses, and/or other devices for transmitting electromagnetic radiation. Wireless power transceiver 502 draws power from power source 506. Power source 506 includes one or more of a battery, fuel cell, connection to a power grid, generator, solar panel, and/or other source of electrical energy. In some alternative embodiments, wireless power transceiver 502 and a separate power source 506 dedicated to wireless power transceiver are separate from ground control station 500. In alternative embodiments, recharging or refueling device 502 is a refueling device configured to refuel UAV 102 with liquid or solid fuel through a refueling port of UAV 102.

Ground control station further includes line of sight transceiver 416. For example, and without limitation, line of sight transceiver 416 is configured to transmit and receive a coherent beam of laser light, microwaves, infrared light, and/or other electromagnetic energy. Line of sight transceiver 416 is or includes, for example, and without limitation, a laser, maser, infrared emitter, active-pixel sensor, bolometers, charge-coupled devices (CCD) sensors, photodiodes, or complementary metal-oxide-semiconductor (CMOS) sensors. In alternative embodiments, line of sight transceiver 416 is separate from ground control station and is included in a data hub with communication connections to additional remote computing devices. The high band width available through line of sight transceiver 416 allows for UAV 102 to transmit large numbers of high resolution images to ground control station 500 and/or other computer devices for processing off board of UAV 102. This minimizes the computing requirements and weight of UAV 102 increasing range and flight time. Ground control station 500 and/or other computing devices process images and/or image data from UAV 102 for a variety of purposes including, for example, and without limitation, visual inspection of industrial asset 1002 (shown in FIG. 10), building a three dimensional model, identifying corrosion, and/or other purposes. High bandwidth provided by line of sight transceiver 416 allows for real time off board processing of the images and/or image data transmitted by UAV 102.

In some embodiments, ground control station 500 is partially or entirely handheld. In other embodiments, ground control station 500 is fixed or otherwise mobile, e.g., included in a vehicle. Ground control station 500 may further include a control system, processor, and/or memory (not shown) which executes one or more instructions, programs, or functions to provide the functions of ground control station 500 described herein.

Figure 6:
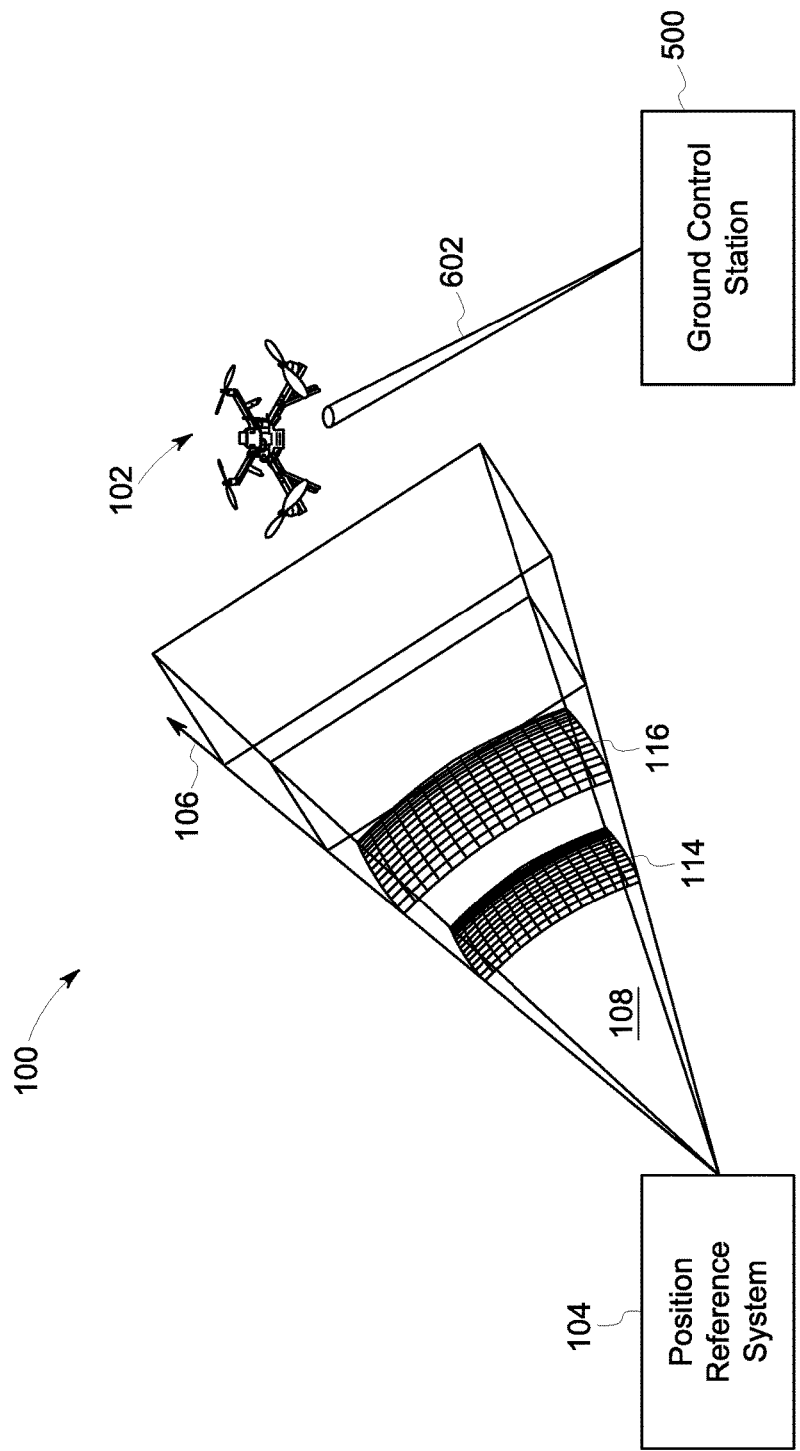
FIG. 6 is a schematic view of the position reference system and UAV shown in FIG. 1 with the UAV positioned for line of sight communication with the ground control station shown in FIG. 5.

FIG. 6 is a schematic view of position reference system 104 and UAV 102 with UAV 102 positioned for line of sight communication with the ground control station 500. UAV 102 is held in a stationary location relative to position reference system 104 using the techniques described herein. UAV 102 holds its location using location information from position reference system 104 transmitted in transmission signal 106 in field of transmission 108 which forms first grid 114 and second grid 116. Ground control station 500 and UAV 102 communicate using a line of sight transmission 602 transmitted between UAV 102 and ground control station 500. As UAV 102 is stationary at a fixed location relative to position reference system 104, ground control station 500 does not require active control of line of sight transceiver 416 (shown in FIG. 5) of ground control station 500 to transmit a coherent beam to line of sight transceiver 416 of UAV 102. For example, and without limitation, ground control station 500 does not include a pointing and tracking system. Rather, an operator of ground control station 500 aims ground control station 500 at stationary UAV 102 to establish line of sight communication between UAV 102 and ground control station 500. In alternative embodiments, ground control station 500 receives a location of UAV 102 from communications system 414 of UAV 102 (shown in FIG. 4) and transmits line of sight transmission 602 to UAV 102 with line of sight transmission 602 aimed based on the known location of UAV 102 and a known location of ground control station 500.

Figure 7:
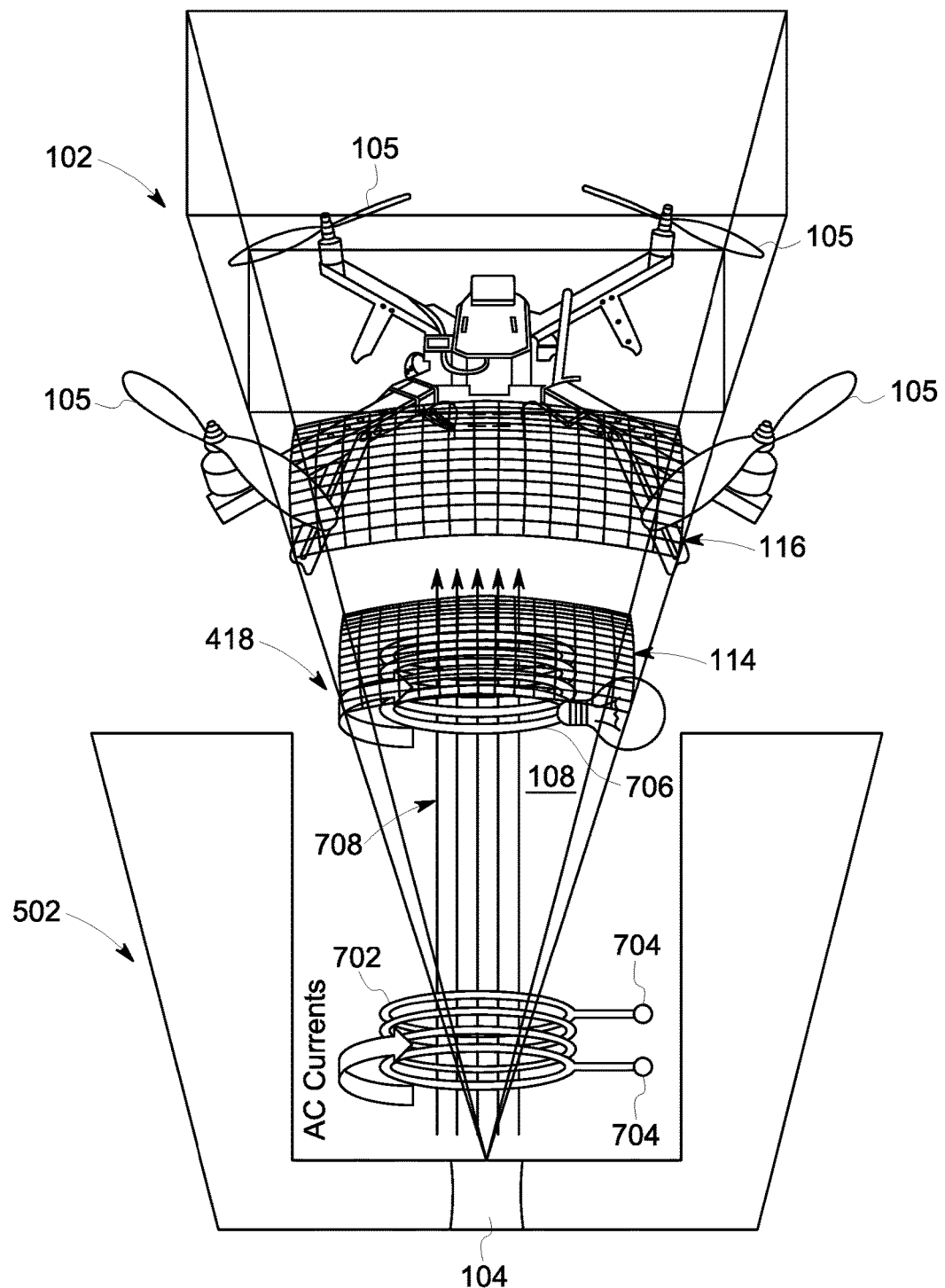
FIG. 7 is a schematic view of the UAV shown in FIG. 1 positioned for wireless charging.

FIG. 7 is a schematic view of UAV 102 positioned for wireless charging by wireless power transceiver 502. UAV 102 is positioned at a stationary location relative to positioning system 104 and/or wireless power transceiver 502 using the techniques described herein. UAV 102 holds its location using location information from position reference system 104 transmitted in transmission signal 106 in field of transmission 108 which forms first grid 114 and second grid 116. UAV 102 controls one or more control devices 105 based on the received location information from positioning system 104 to maintain the stationary location. In some embodiments, positioning system 104 is attached to or included in wireless power transceiver 502. In alternative embodiments, positioning system 104 is remote from wireless power transceiver 502. In some embodiments, wireless power transceiver 502 is included in ground control system 500 (shown in FIG. 5). In alternative embodiments, wireless power transceiver 502 is separate from ground control system 500. UAV 102 is positioned in the air at a stationary location relative to wireless power transceiver 502. In alternative embodiments, UAV 102 uses location information from positioning system 104 to land on a platform (not shown) which positions UAV 102 for wireless charging. In further alternative embodiments, UAV 102 is positioned as described herein for refueling by a refueling device.

Wireless power transceiver 502 includes first inductive coils 702 coupled to power source 420 (shown in FIG. 4) through terminals 704. Alternating current flows through first inductive coils 702 which produces magnetic field 708. Magnetic field 708 encompasses wireless charging receiver 418 of UAV 102 due to the location of UAV 102. Wireless charging receiver 418 includes second inductive coils 706. Magnetic field 708 passing across second inductive coils 706 generates a current in second inductive coils 706 which charges UAV 102. In alternative embodiments, wireless power transceiver 502 uses other wireless charging techniques and components to wirelessly charge UAV 102. For example, and without limitation, wireless power transceiver 502 uses one or more of inductive coupling, resonant inductive coupling, capacitive coupling, magnetodynamic coupling, microwaves, or light transmission to transmit electromagnetic energy. Wireless power transceiver 502 includes one or more antenna devices configured to transmit electromagnetic energy. For example, and without limitation, wireless power transceiver 502 includes wire coils, tuned wire coils, lumped element resonators, electrodes, rotating magnets, parabolic dishes, phased array antennas, lasers, photocells, lenses, and/or other devices for transmitting electromagnetic radiation In alternative embodiments, recharging or refueling device 502 includes a refueling component, for example, and without limitation, a drogue, boom, hose, or other component configured to refuel UAV 102 through a refueling port included in UAV 102.

As UAV 102 is stationary at a fixed location relative to wireless power transceiver 502, ground control station 500 does not require active control of wireless power transceiver 502 to transmit wireless energy to line of wireless charging receiver 418 of UAV 102. For example, and without limitation, ground control station 500 does not include a pointing and tracking system.

Figure 8:
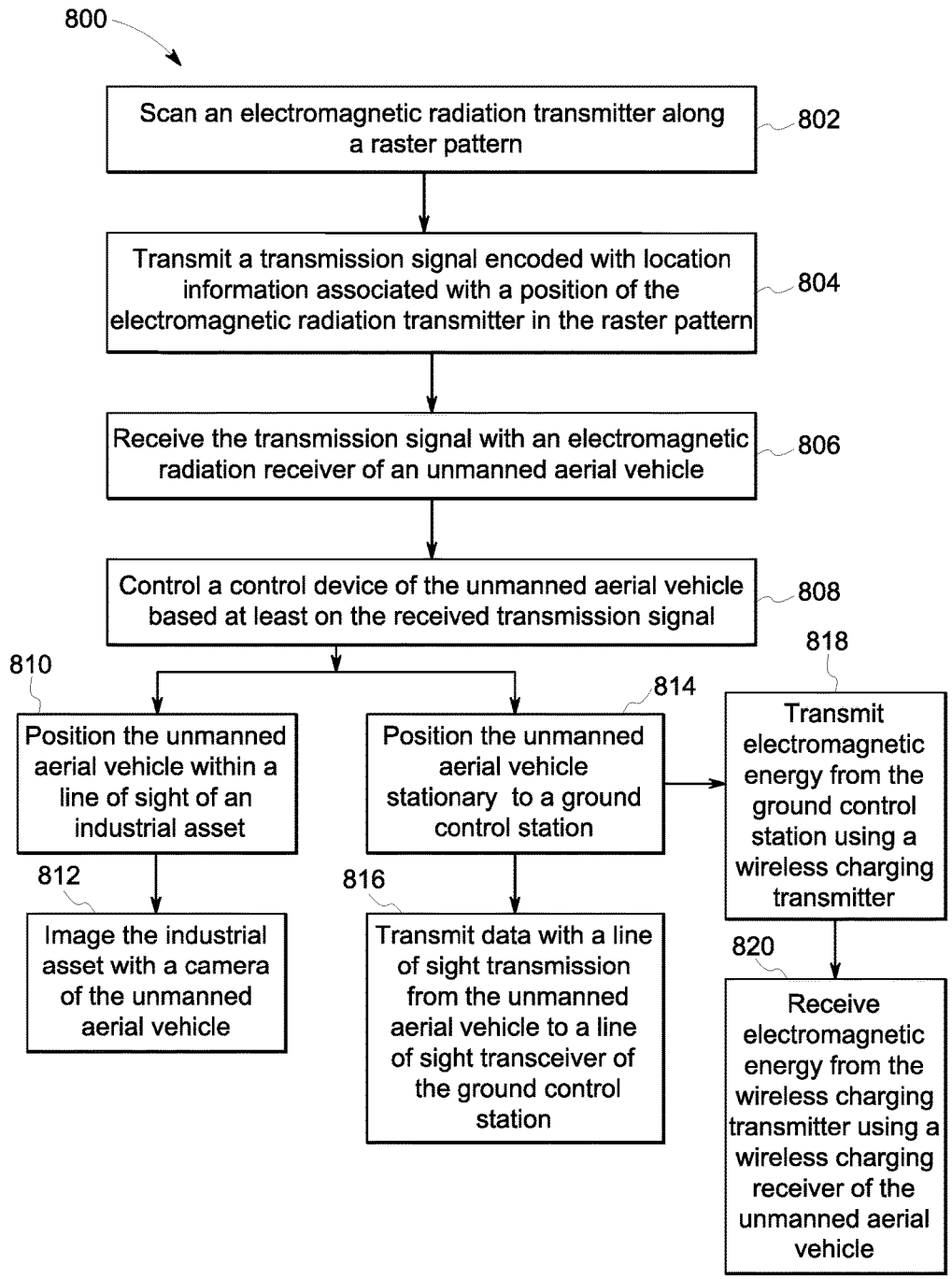
FIG. 8 is a flow chart of an exemplary method of positioning the UAV shown in FIG. 1.

FIG. 8 is a flow chart of an exemplary process 800 of positioning UAV 102 (shown in FIG. 1). Positioning system 104 (shown in FIG. 1) scans 802 electromagnetic radiation transmitter 109 (shown in FIG. 1) along a raster pattern. For example, and without limitation, the raster pattern corresponds to first grid 114 and second grid 116 (both shown in FIG. 1). Positioning system 104 transmits 804 transmission signal 106 (shown in FIG. 1) encoded with location information associated with a position of electromagnetic radiation transmitter 109 in the raster pattern when transmission signal 106 is transmitted. For example, and without limitation, transmission signal 106 is encoded using amplitude modulation as shown in FIG. 2. Electromagnetic radiation receiver 115 (shown in FIG. 1) of UAV 102 receives 806 transmission signal 106. Control system 404 (shown in FIG. 4) of UAV 102 controls 808 at least one control device 105 (shown in FIG. 1) based at least on the received transmission signal 106. For example, and without limitation, control system 404 processes the received transmission signal 106 using signal processor 406 (shown in FIG. 4) and controls control device 105 using flight control system 408 (shown in FIG. 4). Signal processor 406 determines the location of UAV 102 using the location information encoded in transmission signal 106. The location is relative to positioning system 104 or absolute if the location of positioning system 104 is known. In some embodiments, signal processor 406 uses position information, e.g., pitch angle, roll angle, yaw angle, altitude, and/or other position information, from positioning system 410 (shown in FIG. 4) in determining the position and/or location of UAV 102. For example, and without limitation, signal processor 406 combines location information and position information using a Kalman filter.

Figure 10:
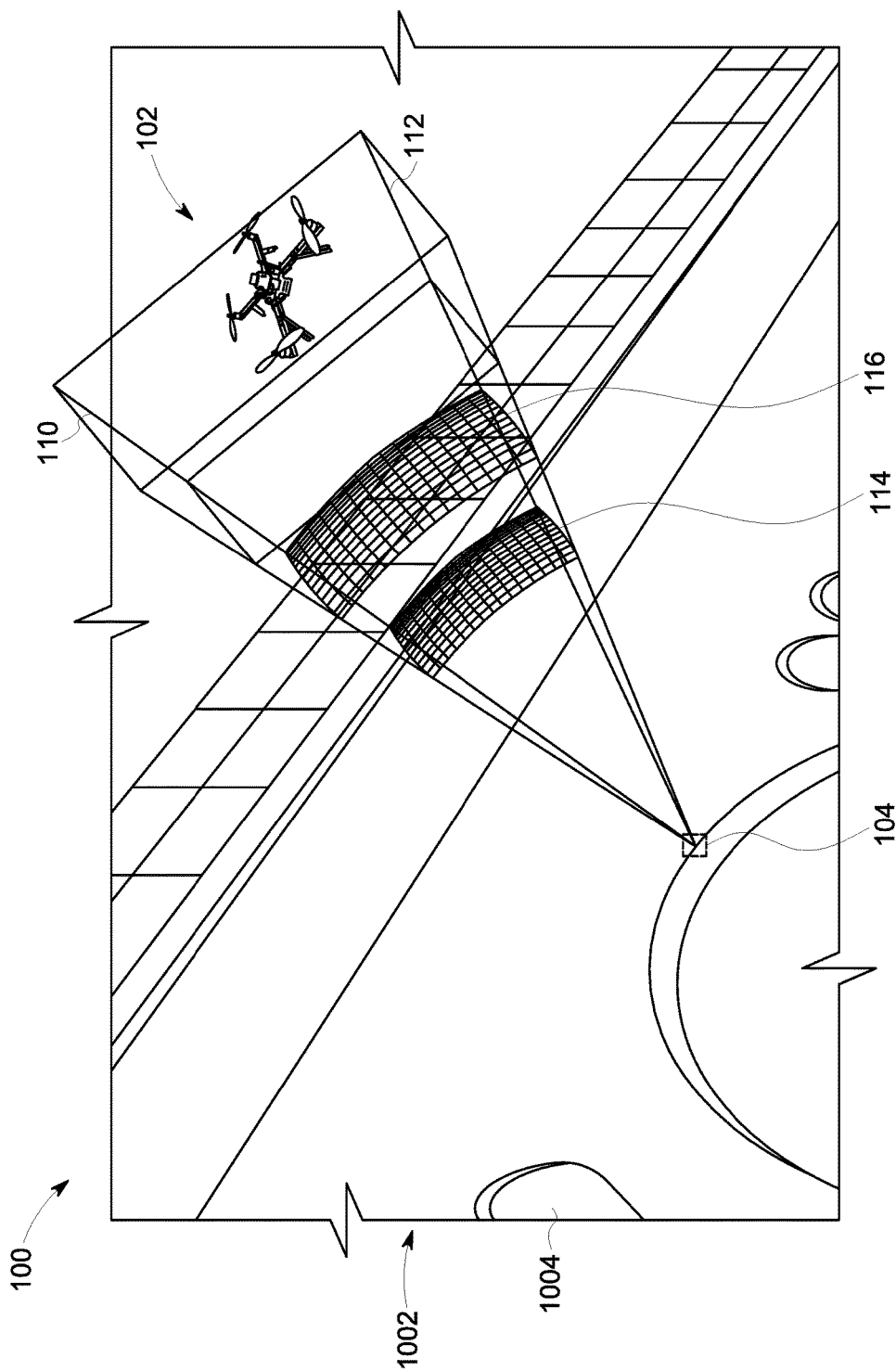
FIG. 10 is a schematic view of the UAV and position reference system shown in FIG. 1 located to inspect a bridge.
Figure 11:
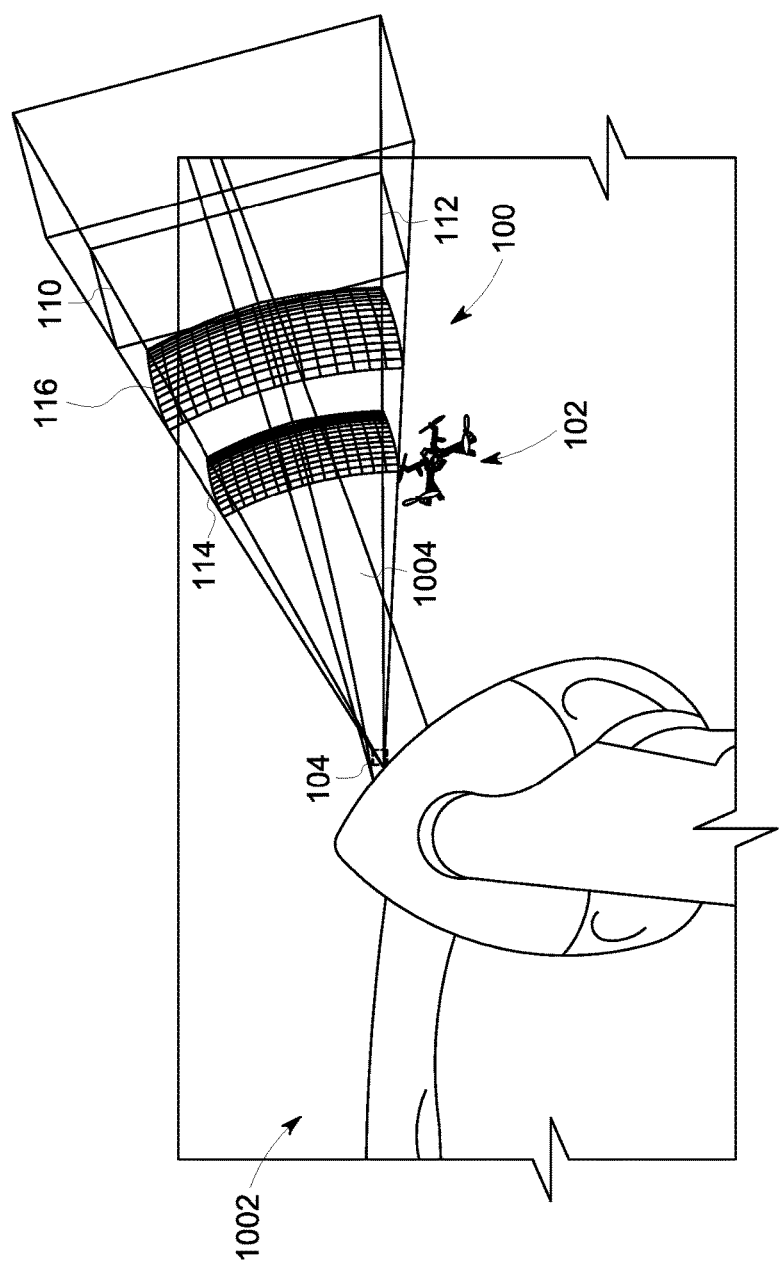
FIG. 11 is a schematic view of the UAV and position reference system shown in FIG. 1 located to inspect a wind turbine blade.

Control system 404 positions 810 UAV 102 within a line of sight of an industrial asset (shown in FIGS. 10 and 11). For example, and without limitation, control system 404 positions UAV 102 based on location and/or position information by controlling at least one control device 105. UAV 102 images 812 the industrial asset, or a target portion of the industrial asset, using a camera 412 (shown in FIG. 4) onboard UAV 102. Camera 412 is controlled by control system 404. For example, and without limitation, control system 404 receives a command from ground control station 500 (shown in FIG. 5) to image a target portion of the industrial asset (shown in FIGS. 10 and 11). In response, control system 404 causes camera 412 to capture an image, multiple images, video, or other image data of the target portion of the industrial asset, the camera 412 being positioned in a line of sight of the target portion of the industrial asset by UAV 102. In alternative embodiments, control system 404 positions UAV 102 near the target portion of the industrial asset and commands from ground control station 500 move camera 412 such that camera 412 views the target portion of the industrial asset. Control system 404 maintains the position and location of UAV 102 relative to the industrial asset and positioning system 104.

In further alternative embodiments, UAV 102 images or otherwise senses the industrial asset, or a target portion of the industrial asset, using a sensory payload. The sensory payload includes one or more visual sensors (e.g., camera 412), thermal cameras, laser range finders, LIDAR systems, and/or other sensors. The sensory payload is controlled using one or more of the techniques described herein with respect to camera 412. In some embodiments, the sensory payload or camera 412 alone is mounted in an actively damped gimbal coupled to UAV 102. The actively damped gimbal provides for image stabilization. The actively damped gimbal is controllable (e.g., by control system 404 and/or ground control station 500) allowing for the sensing direction of sensory payload and/or camera 412 to differ from the direction of travel of UAV 102. The direction of camera 412 and/or other sensors is controllable independently from the position of UAV 102. This allows for sensing of the industrial asset in cases in which UAV 102 is unable to be positioned directly in front of the portion of industrial asset to be sensed.

Control system 404 positions 814 UAV 102 at a location stationary to ground control station 500. For example, UAV 102 is positioned at a location stationary relative to positioning system 104 which allows ground control station 500 to be located or moved to a stationary or substantially stationary, e.g., while hand-held, location relative to UAV 102. In alternative embodiments, ground control station 500 is in communication with UAV 102 and/or ground control station 500 and provides information corresponding to the location of ground control station 500. Using this information and location information from positioning system 104, control system 404 positions UAV 102 at a specific stationary location relative to ground control station 500.

When in the stationary location, UAV 102 transmits 816 data with line of sight transceiver 416 (shown in FIG. 4) to line of sight transceiver 416 of ground control station 500 (shown in FIG. 5). Holding UAV 102 at a stationary location using control system 404 and positioning system 104 facilitates a line of sight communication connection and reduces interruptions in communication due to loss of reception. Line of sight transceiver 416 provides greater bandwidth for data transfer than other communication systems such as radio frequency transceivers. For example, and without limitation, the data transferred to ground control station 500 is image data corresponding to images captured by camera 412 of a target portion of an industrial asset; other image data; data corresponding with a status of UAV 102 such as remaining battery power, flight log data, or current instructions; or new or updated instructions for UAV 102 such as new waypoints or a new destination to travel to. In alternative embodiments, UAV 102 transmits data with line of sight transceiver 416 to a device other than ground control station 500. For example, and without limitation, UAV 102 transmits data to positioning system 104. Positioning system 104 stores the received data for collection or retransmits the received data to a control station or other location.

When in the stationary location, ground control station 500 transmits 818 electromagnetic energy from wireless power transceiver 502 (shown in FIG. 5). For example, and without limitation, wireless power transceiver 502 uses one or more of inductive coupling, resonant inductive coupling, capacitive coupling, magnetodynamic coupling, microwaves, or light transmission to transmit electromagnetic energy. UAV 102 receives 820 the transmitted electromagnetic energy using wireless charging receiver 418 (shown in FIG. 4). Holding UAV 102 at a stationary location using control system 404 and positioning system 104 facilitates reception of electromagnetic energy by reducing uncoupling of wireless power transceiver 502 and wireless charging receiver 418 due to movement of UAV 102. Holding UAV 102 at a stationary location using control system 404 and positioning system 104 further facilitates reception of electromagnetic energy by enabling wireless charging techniques using coherent beams such as charging by reception of laser light or microwaves.

Figure 9:
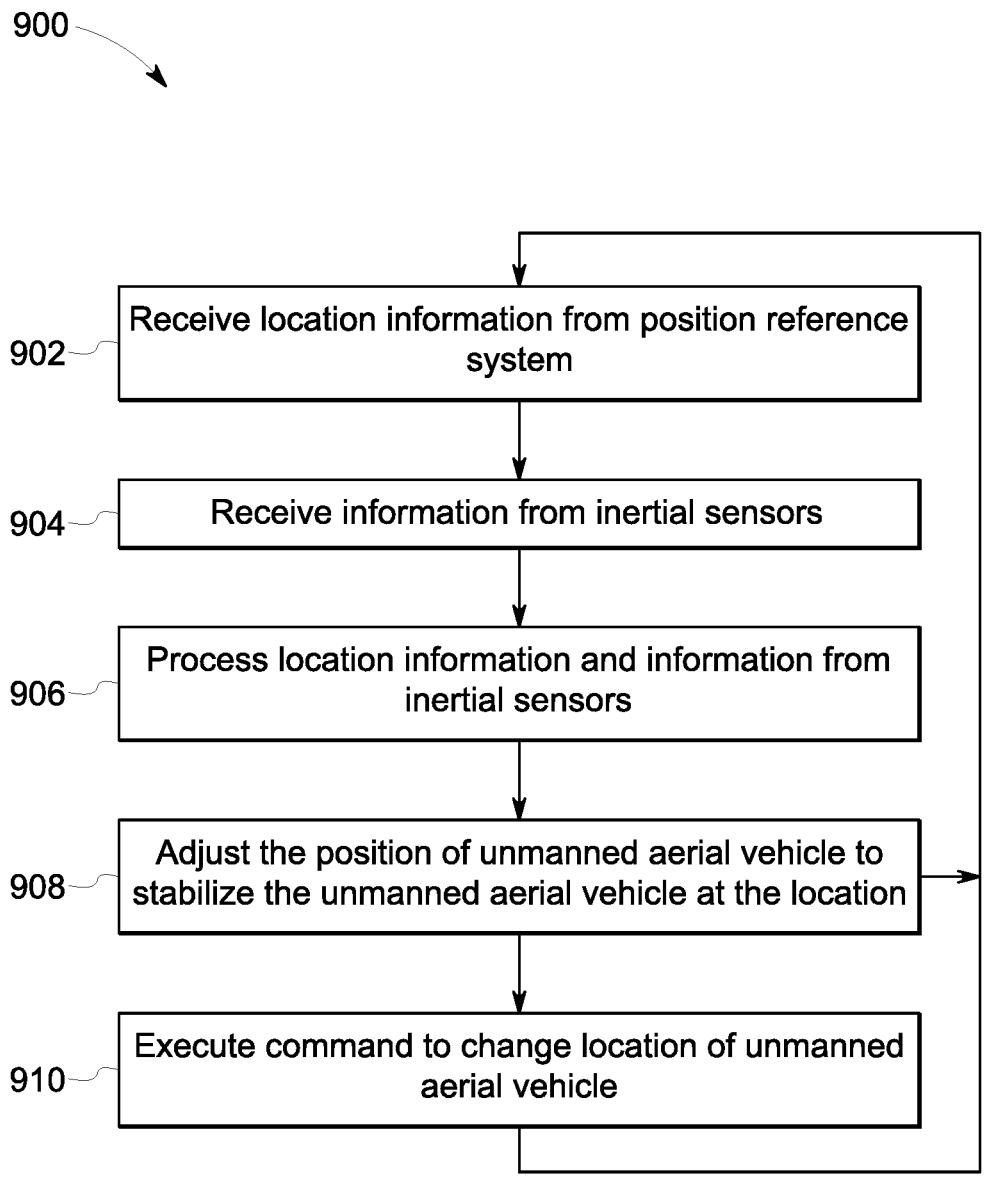
FIG. 9 is a flow chart of an exemplary method of changing the location of the UAV shown in FIG. 1.

FIG. 9 is a flow chart of an exemplary process 900 of changing the location of UAV 102 (shown in FIG. 1). Control system 404 (shown in FIG. 4) of UAV 102 receives 902 location information from positioning system 104 (shown in FIG. 1) using electromagnetic radiation receiver 115 (shown in FIG. 1). For example, and without limitation, location information includes information about the location of UAV 102 relative to positioning system 104. In some embodiments, UAV 102 further receives additional location information from positioning system 410 (shown in FIG. 4) of UAV 102. For example, and without limitation, the additional location information is or includes coordinated from a global positioning system. Control system 404 (shown in FIG. 4) receives 904 position information from inertial sensors. For example, and without limitation, control system 404 receives position information, e.g., a roll angle, a yaw angle, a pitch angle, an airspeed, an altitude, and/or other position information, from sensors of positioning system 410 such as a gyroscope, accelerometer, inclinometer, and/or other sensors. UAV 102 processes 906 the location information and position information. For example, and without limitation, UAV 102 processes the location information and position information using signal processor 406 (shown in FIG. 4) and a Kalman filter or other function. In alternative embodiments, the location information and position information is processed remotely from UAV 102 and results are transmitted to UAV 102. For example, and without limitation, UAV 102 transmits location information and position information to ground control station 500 (shown in FIG. 5) using communications system 414 (shown in FIG. 4). Ground control station 500 processes the location information and position information and transmits the result to communications system 414 of UAV 102.

Based on the processed location information and position information, control system 404 adjusts 908 the position and/or location of UAV 102 to stabilize UAV 102 at a specific location. For example, and without limitation, control system 404 holds UAV 102 at its current location using flight control system 408 (shown in FIG. 4) and control of at least one control device 105 (shown in FIG. 4). UAV 102 iteratively receives location information, receives position information, processes the location and position information, and adjusts the position of UAV 102 to stabilize of maintain UAV 102 at the location.

Control system 404 of UAV 102 executes 910 a command to change the location of UAV 102. For example, and without limitation, UAV 102 receives a command to change location from ground control station 500 using communications system 414. The command to change location is executed by control system 404 and at least one control device 105 is controlled to change the location of UAV 102. The command to change location may be a command to travel to a specific waypoint or destination, a command to actuate a specific control device 105 in a specific way, or another command to otherwise change the location of UAV 102. Once the location of UAV 102 has been changed by executing a command to change location, UAV 102 receives location information from positioning system 104 at the new location. For example, and without limitation, UAV 102 maintains position at a first location based on location data from positioning system 104, executes a command to change location and travels to a second location. At the second location, UAV 102 receives location information from the same or a different positioning system 104. Using the location information from positioning system 104, UAV 102 maintains its location and/or position.

FIG. 10 is a schematic view of UAV 102 and position reference system 104 located to inspect industrial asset 1002. In this embodiment, industrial asset 1002 is a bridge. Industrial asset 1002 includes a target portion 1004 to be inspected by UAV 102. Positioning system 104 is positioned on industrial asset 1002 and projects transmission signal 106 (shown in FIG. 1) to form first grid 114 and second grid 116 bound by upper bound 110 and lower bound 112. UAV 102 receives location information encoded on transmission signal 106 and uses the location information to move UAV 102 to a location for imaging target portion 1004. UAV 102 further uses received location information to hold UAV 102 at a particular location relative to positioning system 104 and therefore relative to target portion 1004. In some embodiments, UAV 102 is instructed to travel to industrial asset 1002 using positioning system 410 (shown in FIG. 4) such satellite navigation. Upon reaching industrial asset 1002, UAV 102 uses positing system 104 to locate UAV 102 for imaging target portion 1004. An operator of UAV 102 using ground control station 500 (shown in FIG. 5) may manually control UAV 102, e.g., manually control one or more control devices 105 (shown in FIG. 4), to locate UAV 102 within a line of sight of target portion 1004. UAV 102 uses location information from positioning system 104 to maintain the location of UAV 102. In some embodiments, a plurality of positioning systems 104 (not shown) provide location information to UAV 102. The plurality of positioning systems 104 may exclusive or overlapping fields of transmission 108 (not shown). The plurality of positioning systems 104 may be associated with a single industrial asset 1002, a plurality of industrial assets 1002, a single target portion 1004, or a plurality of target portions 1004, e.g., with each positioning system 104 corresponding to a different target portion 1004.

FIG. 11 is a schematic view of UAV 102 and position reference system 104 located to inspect industrial asset 1002. In this embodiment, industrial asset 1002 is a wind turbine. Target portion 1004 is a wind turbine blade of industrial asset 1002. Positioning system 104 is located on target portion 1004 and moves with the wind turbine blade. Positioning system 104 projects transmission signal 106 (shown in FIG. 1) to form first grid 114 and second grid 116 bound by upper bound 110 and lower bound 112 which are relative to target portion 1004 and the wind turbine blade. As the wind turbine blade moves, transmission signal 106, first grid 114 and second grid 116 remain stationary relative to the wind turbine blade. Positioning system 104 provides a fixed coordinate system of location information relative to the moving wind turbine blade. This allows UAV 102 to maintain a fixed position relative to the wind turbine blade while the wind turbine blade is in motion. UAV 102 can therefore image target portion 1004 while the industrial asset remains in service and target portion 1004 is in motion. In some embodiments, UAV 102 is instructed to travel to industrial asset 1002 using positioning system 410 (shown in FIG. 410) such satellite navigation. Upon reaching industrial asset 1002, UAV 102 uses positing system 104 to locate UAV 102 for imaging target portion 1004. Positioning system 104 allows UAV 102 to travel to a location for imaging target portion 1004 while avoiding obstacles, e.g., other wind turbine blades. An operator of UAV 102 using ground control station 500 (shown in FIG. 5) may manually control UAV 102, e.g., manually control one or more control devices 105 (shown in FIG. 4), to locate UAV 102 within a line of sight of target portion 1004. UAV 102 uses location information from positioning system 104 to maintain the location of UAV 102.

The above-described method and system provide for provide for enhanced positioning and locating of an unmanned aerial vehicle. The method and systems described herein allow for enhanced imaging of an industrial asset by the unmanned aerial vehicle as the unmanned aerial vehicle is located stationary relative to the industrial asset by the enhanced positioning of the unmanned aerial vehicle. Additionally, the systems and methods described herein facilitate data transfer by a line of sight transceiver of the unmanned aerial vehicle by maintaining the unmanned aerial vehicle at a stationary location. Also, the systems and methods described herein facilitate wireless charging of the unmanned aerial vehicle by maintaining the unmanned aerial vehicle at a stationary location. By accurately positioning and locating an unmanned aerial vehicle relative to a fixed or moving positioning system, the unmanned aerial vehicle is capable of enhanced imaging of industrial assets, data transmission by a line of sight transceiver, and wireless charging of the unmanned aerial vehicle.

An exemplary technical effect of the methods, systems, and apparatus described herein includes at least one of: (a) positioning an unmanned aerial vehicle at a location relative to a positioning system; (b) imaging an industrial asset corresponding to the positioning system using the unmanned aerial vehicle stabilized based on location information from the positioning system; (c) positioning the unmanned aerial vehicle at a location stationary relative to a ground control station; (d) transmitting data using a line of sight transceiver from the stationary unmanned aerial vehicle to the ground control station; and (e) receiving electromagnetic energy at the stationary unmanned aerial vehicle to charge the unmanned aerial vehicle.

Exemplary embodiments of method and systems for positioning an unmanned aerial vehicle are described above in detail. The method and systems described herein are not limited to the specific embodiments described herein, but rather, components of systems or steps of the methods may be utilized independently and separately from other components or steps described herein. For example, the methods may also be used in combination with multiple unmanned aerial vehicles and/or positioning systems, and are not limited to practice with only unmanned vehicles and positioning systems as described herein. Additionally, the methods may also be used with other components of devices, and are not limited to practice with only the components as described herein. Rather, the exemplary embodiments may be implemented and utilized in connection with many other unmanned vehicles and positioning systems.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A positioning system for positioning an unmanned aerial vehicle, said positioning system comprising:
    a position reference system comprising an electromagnetic radiation transmitter for modulating a transmission signal to encode location information associated with a coordinate system relative to said electromagnetic radiation transmitter; and
    an unmanned aerial vehicle comprising:
        at least one control device for controlling a position of said unmanned aerial vehicle, wherein the control device comprises at least one of: a thrust device, a control surface, and a mechanism configured to change a pitch angle of a propeller or a pitch angle of a rotor blade or a tilt angle of a rotor blade;
        an electromagnetic radiation receiver for receiving said transmission signal; and
        a control system for controlling said at least one control device based at least in part on said location information received by said electromagnetic radiation receiver,
    wherein the modulated transmission signal is also encoded with temporal location information indicating a time of transmission of the modulated transmission signal for determining a distance from the positioning system when the transmission signal is received by the electromagnetic radiation receiver of the unmanned aerial vehicle based on a time difference between the time of transmission of the modulated transmission signal and a time of reception of the modulated transmission signal.

2. The positioning system in accordance with claim 1, wherein said unmanned aerial vehicle further comprises a first line of sight communication transceiver and said positioning system further comprises a ground control station comprising a second line of sight communication transceiver configured to communicate with said first line of sight communication transceiver.

3. The positioning system in accordance with claim 2, wherein said control system is further configured to control said at least one control device based on said location information in a station-keeping mode to keep said unmanned aerial vehicle substantially at a specific point relative to said position reference system, and wherein said station-keeping mode facilitates communication between said first line of sight communication transceiver and said second line of sight communication transceiver.

4. The positioning system in accordance with claim 2, wherein said first line of sight communication transceiver and said second line of sight communication transceiver are at least one of a laser light transceiver, an infrared transceiver, or a microwave transceiver.

5. The positioning system in accordance with claim 2, wherein said unmanned aerial vehicle further comprises a camera configured to transmit image information to said ground control station using said first line of sight communication transceiver.

6. The positioning system in accordance with claim 5, wherein said ground control station is configured to process said image information.

7. The positioning system in accordance with claim 1, wherein said unmanned aerial vehicle further comprises a wireless charging receiver configured to receive electromagnetic energy and said positioning system further comprises a ground control station, said ground control station comprising a wireless charging transmitter configured to transmit electromagnetic energy to said wireless charging receiver.

8. The positioning system in accordance with claim 7, wherein said control system is further configured to control said at least one control device based on said location information in a station-keeping mode to maintain said unmanned aerial vehicle substantially at a specific point relative to said position reference system and said station-keeping mode facilitates transmission of electromagnetic energy from said wireless charging transmitter to said wireless charging receiver.

9. The positioning system in accordance with claim 7, wherein said wireless charging receiver and said wireless charging transmitter are configured to receive energy and transmit energy, respectively, using at least one of magnetic induction, a beam of microwave energy, or a beam of laser light energy.

10. The positioning system in accordance with claim 1, wherein said electromagnetic radiation transmitter is a laser transmitter.

11. The positioning system in accordance with claim 1, wherein said position reference system is configured to scan a beam emitted by said electromagnetic radiation transmitter in a raster pattern and the location information encoded on the beam corresponds to a current location of the beam within the raster pattern.

12. The positioning system in accordance with claim 1, wherein said unmanned aerial vehicle further comprises a camera, said position reference system positioned such that said electromagnetic radiation transmitter is configured to emit said transmission signal directed toward an industrial asset.

13. The positioning system in accordance with claim 1, wherein said unmanned aerial vehicle further comprises a fuel port configured to receive fuel and said positioning system further comprises a refueling device configured to provide fuel from a fuel source to said fuel port.

14. The positioning system in accordance with claim 13, wherein said control system is further configured to control said at least one control device based on said location information in a station-keeping mode to maintain said unmanned aerial vehicle substantially at a specific point relative to said position reference system and said station-keeping mode facilitates refueling of said unmanned aerial vehicle by said refueling device.

* * * * *